Feb. 9, 1932.  A. PALADIN  1,844,592
TAXIDERMIST'S BODY FORM
Filed Nov. 25, 1927
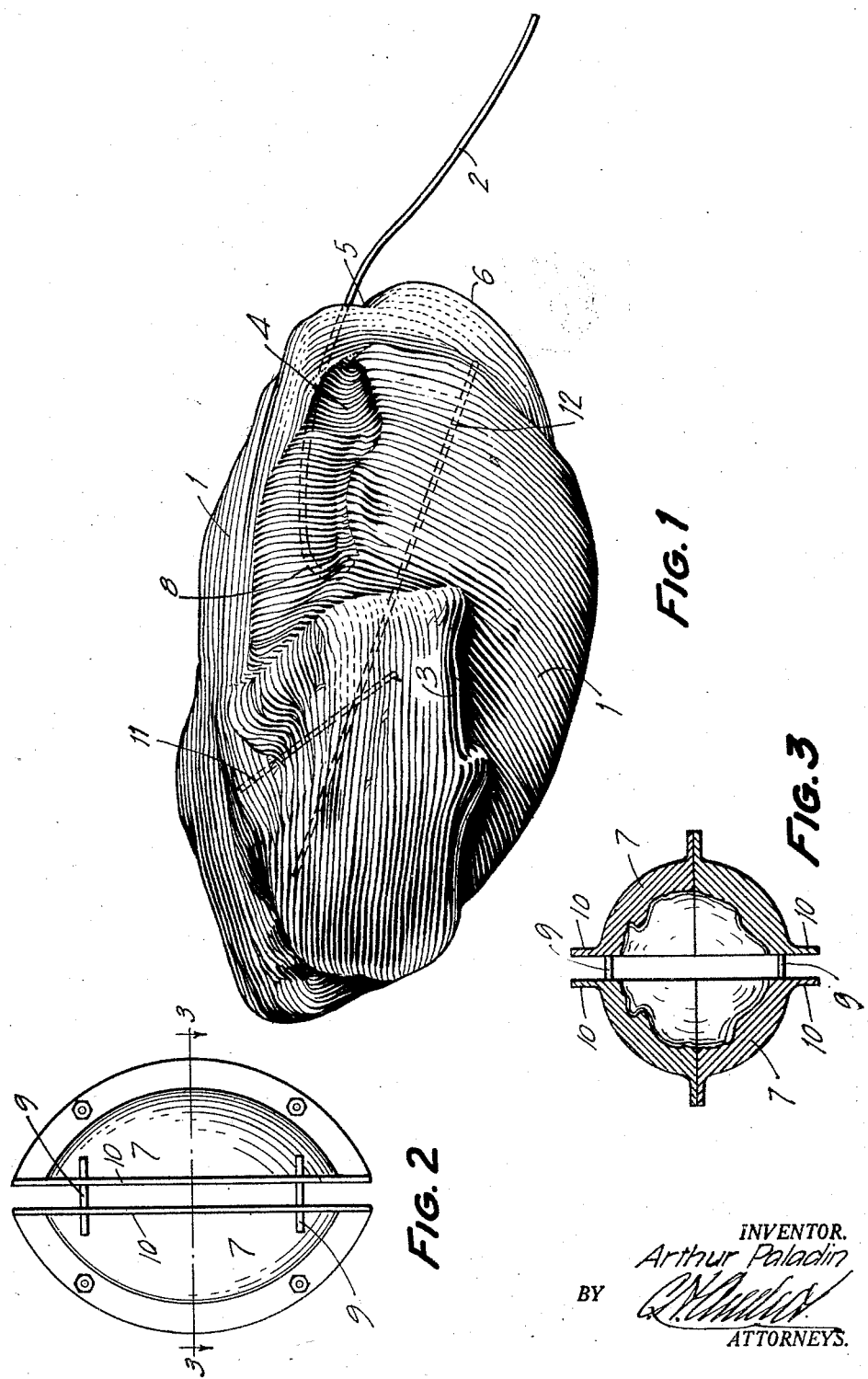
INVENTOR.
Arthur Paladin
BY
ATTORNEYS.

Patented Feb. 9, 1932

1,844,592

UNITED STATES PATENT OFFICE

ARTHUR PALADIN, OF ALBANY, NEW YORK

TAXIDERMIST'S BODY FORM

Application filed November 25, 1927. Serial No. 235,720.

My invention relates to the art of taxidermy and particularly to a new body form over which the skin of a bird may be quickly stretched and which will substantially conform in all respects as to size and configuration with the carcass of the bird from which the skin was removed.

In the ordinary course of business, a taxidermist is called upon to stuff and mount birds, animals and fish of all varieties and, generally speaking, each subject presents its own problem. However, since the introduction and extensive propagation in this country of such beautifully colored birds as the Mongolian pheasant, taxidermists are called upon to stuff and mount large numbers of this and like species.

In preparing to mount a bird, the ordinary practice heretofore has been to construct a body form by winding string about a loose mass of excelsior or the like. In addition to being a tedious process, a body form so constructed conforms only approximately to the carcass of the bird and it is necessary to fill various spaces here and there between the skin and body form with cotton or other material to obtain the proper appearance. Moreover, pins inserted in such a body to hold the skin in place are not very securely anchored.

With these difficulties in mind, and where a large number of birds of one species must be mounted, I find that the work may be done much quicker and more satisfactorily by using premolded bodies of suitable material which may be cheaply produced in large quantities.

I find that the majority of the fully developed birds of one species do not vary greatly in size. Moreover, a skin can be stretched to a considerable extent. This being so, I find that a body carefully molded to conform to the skinned carcass of a large bird may be readily used with any other skin.

The objects of my invention therefore are to provide a cheap, but light and strong body form for the use of taxidermists who are required to mount a large number of specimens of the same species of bird or other creature. Another object is to provide a device of this character provided with means for the reception of the leg bones and also for the wing bones where it is desired to mount the specimens with wings spread or extended. Generally speaking, the objects of my invention are to provide a premolded body form which will permit a skin to be drawn thereover and secured in place very quickly and which will not require any substantial amount of auxiliary filling to give the birds a natural appearance. A further object of my invention is to provide a method whereby such a body form may be cheaply and easily manufactured in quantities.

With these objects in view my invention includes the novel device and method of procedure described below and illustrated in the accompanying drawings in which—

Fig. 1 is a perspective view of my body form as seen from the right hand side thereof;

Fig. 2 is an outside view of the mold drawn to a greatly reduced scale; and

Fig. 3 is a section of the mold in the plane 3—3.

Referring to the drawings, 1 generally represents the body form which is molded of suitable material as hereinafter set forth. 2 is the neck wire, one end of which is anchored within the body. On each side of the body at about the points where the upper ends of the large leg bones come, projections, 3, are provided which are adapted to rest upon the ends of these bones. In each side of the body, near the top front part thereof, sockets, 4, are provided into which the ends of the wing bones may be inserted where it is desired to mount the specimen with wings extended. It will be noted that the front portion of the body, beginning at a point, 5, just below the point where the neck wire emerges, and extending downwardly throughout the place normally occupied by the crop of the bird, is swelled or distended, as at 6, to provide a well rounded breast in the finished specimen.

In selecting a suitable material out of which the body is to be molded, I prefer to use ground wood pulp because it is cheap, light, easily molded into a coherent mass, may be easily penetrated by a pin or the like, and will form a firm anchorage for pins so inserted. Furthermore, a body of this material, when it is once dry, is permanent in character.

In proceeding to manufacture bodies of this character, a model in clay or plaster of Paris should first be made. This model, for a bird the size of a pheasant, should be made considerably larger than the actual skinned carcass of the bird because it will be found that there is considerable shrinkage in the molded body during the drying process. This shrinkage will be as much as one inch in eight inches, and proper allowance must be made therefor. After the model has been made with the sockets therein adapted to receive the ends of the wing bones, the projections upon which the leg bones rest, and a well rounded full crop, a mold, 7, is made therefrom of iron or any other suitable material. On account of the reentrant portions in the body, such as the wing bone sockets and the like, it will be found advisable to make this mold in quarter sections, as shown in Figs. 2 and 3, instead of half sections, as is usual, so that it may be readily removed from the molded body form without damaging the sockets. However, during the molding proper, it will generally be found advisable to use it in halves. The body form is thus free from substantial proturberances, whereby the skin of the bird may readily be drawn over the form.

Each half of the mold, 7, is filled heaping full of ground wood pulp which has been mixed with water to make it of the proper consistency. The neck wire, having a hooked or bent portion, 8, at one end to form an anchor, is laid on top of the pulp in one half of the mold and the other half of the mold is then placed upon it and the halves are squeezed together by any suitable means, such as a vise, so that the pulp is compressed together into a coherent mass and most of the water therein is squeezed out. During the squeezing process the halves of the mold may be held in line by guiding rods, 9, passed through holes in the mold flanges, 10. After squeezing, the body form is removed from the mold and thoroughly dried. If desired, wires, such as 11 and 12, may be buried in the pulp mass during the molding process and will act as reinforcing for holding the body together.

While I prefer to use ground wood pulp for constructing a body form it is obvious that other moldable material, such as sawdust with a suitable binder, or any other material may be used although I prefer something which is light, easily molded and easily penetrated by a pin.

It is therefore to be understood that the words which I have used in describing my invention are words of description rather than of limitation and that changes within the purview of the appended claims may be made without departing from the true scope and spirit of my invention.

What I claim is—

1. A body form for a stuffed bird composed of a coherent mass of compressed moldable material conforming substantially in shape and size to the natural body of the bird, but having sockets therein adapted to receive the ends of the wing bones for facilitating the mounting of the bird with wings extended.

2. A body form for a stuffed bird composed of a coherent mass of compressed moldable material conforming substantially in shape and size to the natural body of the bird, and having projecting portions at each side adapted to rest upon the ends of the leg bones.

3. A body form for a stuffed bird composed of a coherent mass of compressed moldable material conforming substantially in shape and size to the natural body of the bird; said form being provided with sockets therein adapted to receive the ends of the wing bones, and having projecting portions at either side adapted to rest upon the leg bones.

4. A body form for a creature having a skin; said form being composed of a coherent mass of compressed, ground wood pulp of spongy consistency whereby it may readily be pierced by a pin and conforming substantially in shape and size to the body of said creature.

5. A body form for a stuffed creature having a skin; said form being composed of a coherent mass of ground wood pulp of spongy consistency, whereby it may readily be pierced by a pin, and conforming substantially in shape and size to the natural body of the creature but being free from substantial protuberances whereby the skin of the creature may be drawn thereover.

ARTHUR PALADIN.